US005524139A

United States Patent [19]
Jones

[11] Patent Number: 5,524,139
[45] Date of Patent: Jun. 4, 1996

[54] SYSTEM FOR AUTOMATIC ACCESS TO AUTOMATED TELEPHONIC INFORMATION SERVICES

[75] Inventor: Scott A. Jones, Prides Crossing, Mass.

[73] Assignee: Boston Technology, Inc., Wakefield, Mass.

[21] Appl. No.: 275,358

[22] Filed: Jul. 15, 1994

[51] Int. Cl.$^6$ .................................................. H04M 1/64
[52] U.S. Cl. .............................. 379/67; 379/74; 379/201
[58] Field of Search ................................. 379/34, 35, 67, 379/84, 88, 97, 210, 212, 213, 214, 216, 201

[56] References Cited

U.S. PATENT DOCUMENTS

| | | | |
|---|---|---|---|
| 4,591,664 | 5/1986 | Freeman | 379/212 |
| 4,737,982 | 4/1988 | Boratgis et al. | 379/212 |
| 4,799,254 | 1/1989 | Dayton et al. | 379/97 |
| 4,926,461 | 5/1990 | Kuok | 379/212 |
| 5,058,152 | 10/1991 | Solomon et al. | 379/212 |
| 5,202,914 | 4/1993 | Kim et al. | 379/97 |
| 5,381,470 | 1/1995 | Cambray et al. | 379/216 |

*Primary Examiner*—Jeffery Hofsass
*Assistant Examiner*—Daniel S. Hunter

[57] ABSTRACT

An information services system accessed via telephones by subscribers stores lists of codes for accessing automated telephonic information services, such as telephone banking, airline reservations, stock quotes, etc. A subscriber to an information services system according to the invention accesses the system and enters a gateway learn mode in which the subscriber is given a dial tone via a switch which permits the information services system to separately identify signals from the subscriber and from the number called by the subscriber. Representations of the dual tone multi-frequency (DTMF) signals generated by the subscriber are stored as tone codes, together with time codes indicating when the DTMF signals should be generated in an execution mode. In addition, command signals, preferably received as voice signals, from the subscriber are detected using voice recognition and control codes are stored corresponding to the command signals. The list of codes produced from the tone, time and control codes can be used upon request by the subscriber or automatically with a frequency determined by the subscriber, to access the automated telephonic information service.

19 Claims, 3 Drawing Sheets

FIG. 3

SYSTEM FOR AUTOMATIC ACCESS TO AUTOMATED TELEPHONIC INFORMATION SERVICES

BACKGROUND OF THE INVENTION

1. Field of the Invention

The present invention is directed to an information services system accessed via telephone by subscribers to obtain the services provided and, more particularly, to providing a service for automatically accessing automated telephonic information services, such as telephone banking, airline reservations, stock quotes, etc.

2. Description of the Related Art

An increasing number of services are accessible via telephone without requiring a human operator. Such services include telephone banking, stock quotes and other financial services; airline, theatre, and other entertainment reservations; weather information for different cities; university registration; and many others. These services will be referred to generically as "automated telephonic information services".

At the same time, many businesses and individuals have installed or subscribed to information services systems which provide services such as voice mail. Voice mail permits subscribers to such services to receive phone calls from other people when the subscribers are not available to answer their telephone. However, the only way for anyone to obtain information from an automated telephonic information service is to dial the number for the service and respond to menu prompts generated by the automated telephonic information service. The telephone number and one or more personal identification numbers might be stored as repertory dial or speed dial numbers, but no known system enables the process of accessing an automated telephonic information service to be automated.

SUMMARY OF THE INVENTION

An object of the present invention is to provide a system for automatically interacting with automated telephonic information services.

Another object of the present invention is to automatically initiate interaction with an automated telephonic information service.

A further object of the present invention is to automatically record selected information obtained from an automated telephonic information service during automatic interaction therewith.

Yet another object is to monitor manual interaction with an automated telephonic information service to detect commands entered manually and to store the commands with timing information and information corresponding to signals received from the automated telephonic information service prior to input of the commands.

A still further object of the present invention is to permit a user of a system according to the present invention to interrupt automatic operation and take over control of interaction with the automated telephonic information service.

The above objects are attained by providing a method of automatically interacting with automated telephonic information services, comprising the steps of: storing a list of codes associated with at least one automated telephonic information service; and automatically generating response signals, e.g., dual tone multifrequency (DTMF) signals, with timing thereof controlled by the list of codes previously stored or the response signals, for example, may be recorded voice commands. Preferably, the list of codes includes response codes representing the response signals and control codes for controlling the timing of when the response signals are generated.

A subscriber using a system according to the present invention will receive an audio menu which includes an option for access to a gateway learn mode. If the subscriber wishes to use the gateway learn mode, the appropriate response can be entered using a twelve-key or sixteen-key DTMF keypad. The subscriber then manually generates original DTMF signals to access the automated telephonic information service which is to be automatically interacted with in the future. The information services system or gateway system which acts as a gateway to the automated telephonic information service detects the original DTMF signals and stores response codes representing the original DTMF signals as they are supplied to the automated telephonic information service and stores information on the timing of the DTMF signals, including signals received from the automated telephonic information service prior to input of the original DTMF signals.

The gateway system may also generate response codes by detecting the types of signals at the automated telephonic information services system, such as a ring signal, voice prompt, audio reference information and other tones. Using heuristics, a list of codes is generated which can duplicate the action of the automated telephonic information service. A test run may be performed using the generated codes.

Preferably, a system according to the present invention includes voice recognition capability for detecting voice commands from the subscriber. One set of commands are "record start" and "record stop" which are used to instruct a system according to the present invention to record the information, e.g., stock quote listing, newsletter, sports score, horoscope, etc., received from the automated telephonic information service as a voice mail message. A single voice mail message may be generated from several pieces of information received from one or more automated telephonic information services by using a series of record start and record stop commands. Another possible set of commands are "pause" and "resume". A pause command may be inserted into a list of codes or spoken during use of a list of codes to interrupt the automatic generation of response signals to permit the subscriber to use the twelve-key (or sixteen-key) keypad and then continue automatic interaction with the automated telephonic information service by speaking the resume command.

In an alternative embodiment, keypad codes alone are used to control the gateway system. For example, the "*" key may be used to signify commands to the gateway system (an "attention" signal), while "**" would be required to send a single "*" to an automated telephonic information service. Using either method of command input, the present invention preferably provides a learn mode in which commands sent to an automated telephonic information service are detected and stored; an assisted execution mode in which previously stored codes interact with an automated telephonic information service upon request by a user and may be interrupted for manual interaction by the user; and an automatic execution mode in which previously stored codes are used to interact with an automated telephonic information service automatically at a previously determined time.

These objects, together with other objects and advantages which will be subsequently apparent, reside in the details of construction and operation as more fully hereinafter

DESCRIPTION OF THE PREFERRED EMBODIMENTS

Figure 1:
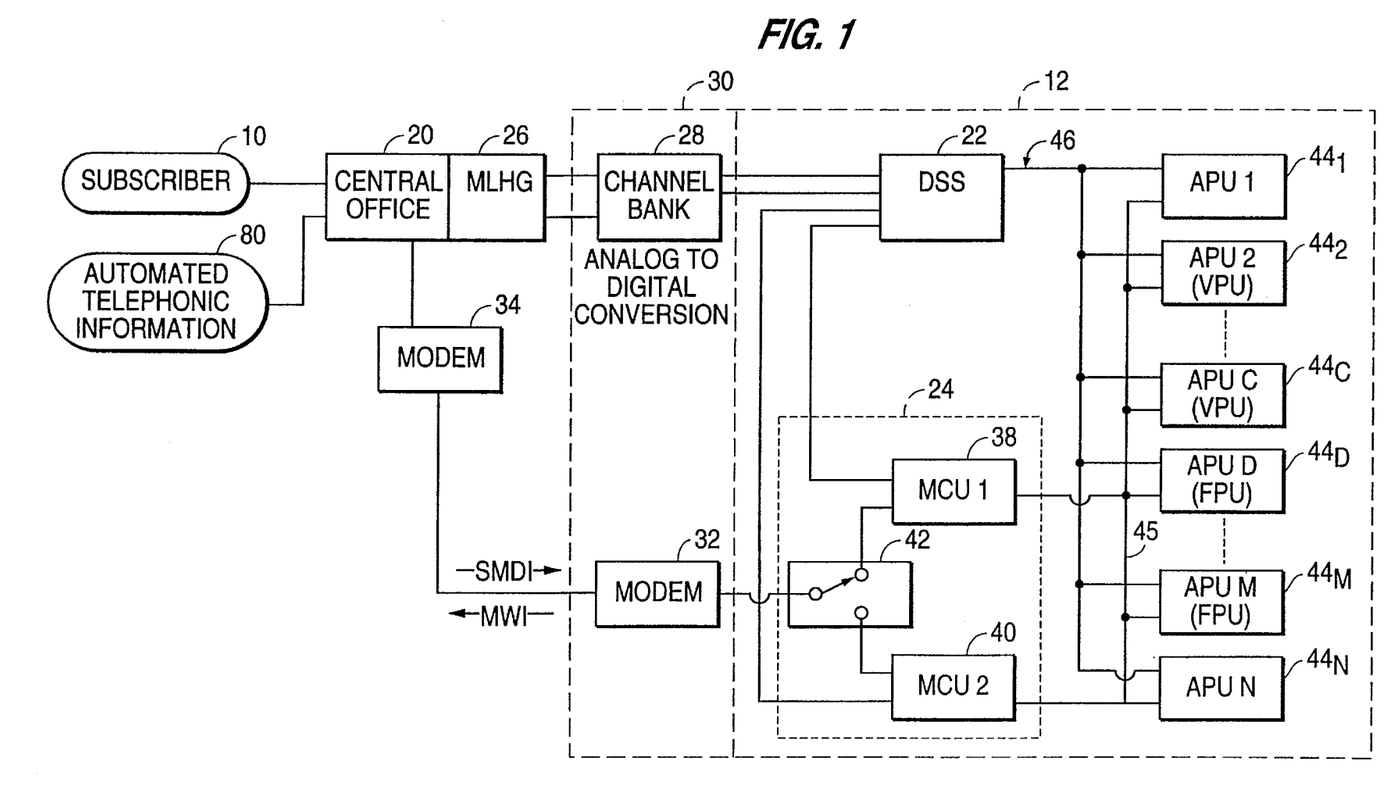
FIG. 1 is a block diagram of an information services system according to the present invention connected to a subscriber and an automated telephonic information service via a central office.

As illustrated in FIG. 1, a subscriber 10 obtains access to an information services system 12 by dialing the number of the information services system 12. A central office 20 connects the subscriber 10 to the information services system 12. The information services system 12 may be a system like those disclosed in U.S. Pat. Nos. 4,371,752; 4,580,012; 4,581,486; 4,585,906; and 4,602,129, all assigned to VMX, Inc. (U.S. Pat. No. 4,371,752 was originally assigned to ECS Telecommunications, Inc.) and U.S. Pat. Nos. 5,029,199 and 5,193,110; both of which are assigned to Boston Technology, Inc. and are both incorporated herein by reference.

As described in U.S. Pat. No. 5,029,199 and U.S. Pat. No. 5,193,110, the information services system 12 includes a digital switching system (DSS) 22 controlled by a control unit 24. The DSS 22 is connected to the central office 20 via multiline hunt group (MLHG) 26. If the central office 20 is a digital central office, the DSS 22 can be connected directly to the MLHG 26. If the central office 20 is an older analog central office, a channel bank 28 is provided in an analog-to-digital conversion unit 30 to connect the DSS 22 to the MLHG 26. In addition to voice band signaling, the central office 20 typically provides information via a protocol, such as the simplified message desk interface (SMDI), between a modem 32 in analog-to-digital conversion unit 30 and a modem 34 for the central office 20.

The control unit 24 preferably includes at least two master control units (MCUs) 38, 40. As described in U.S. Pat. No. 5,029,199, only one MCU has control of the DSS 22 at any given time. A switch 42 is illustrated indicating which MCU has control of the system, although a physical switch 42 may not be present. The services of the information services platform 12 are provided by application processing units (APUs) 44 which are connected to each other and to the MCUs 38, 40 via an internal bus 45, such as an ETHERNET network. The APUs 44 may be dedicated to a specific function, such as voice processing or facsimile processing, or may be multipurpose units, such as $APU_1$ $44_1$ and $APU_N$ $44_N$. All of the APUs 44 are connected to the DSS 22 via a digital line, such as a T1 line.

Figure 2:
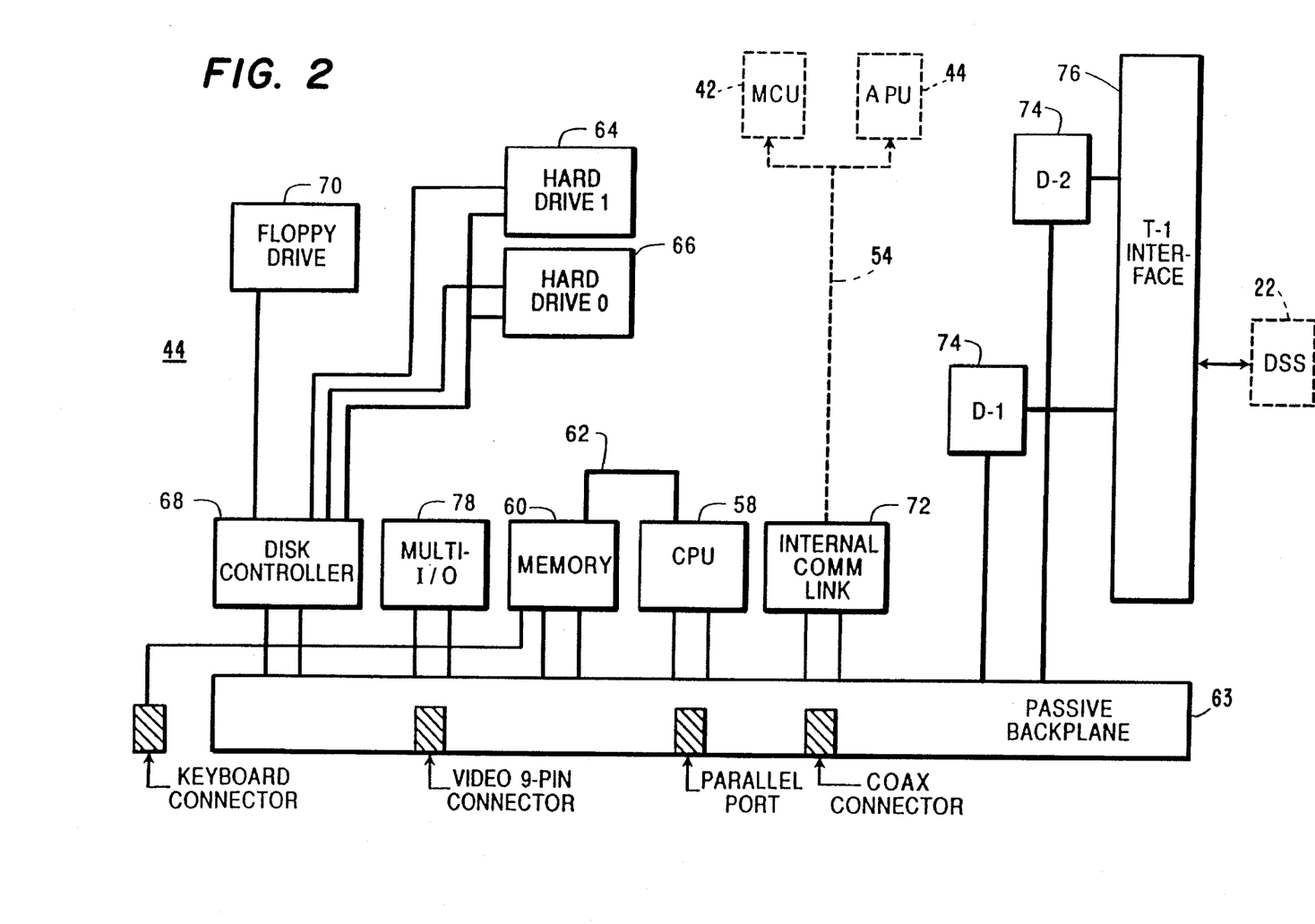
FIG. 2 is a block diagram of an application processing unit used in a system according to the present invention.

An example of an application processing unit 44 is illustrated in FIG. 2. A central processing unit (CPU) 58, such as an INTEL 80386, is connected to a memory 60 via a conventional 32 channel bus 62. Connections to other devices within an APU 44 are provided by a passive backplane 63. These devices include hard drives 64, 66 connected to a disk controller 68 which also controls a floppy drive 70. An internal communication link 72, such as an ETHERNET communication link, connects the APU 44 to other processors in the platform 10, such as the MCUs 38, 40 in the control unit 24 and other APUs 44. Digital ports 74 connect the passive backplane 63 to the DSS 22 via a telephone communication standard T1 interface 76. The digital ports 74 may be provided on line cards which include DTMF signal detection and generation and higher level capabilities, such as handling facsimile protocols, as in the case of Model No. TR112LL from Brooktrout Technology, Inc. of Wellesly Hills, Mass. Other input and output may be provided by multi-I/O unit 78. All the components in an APU 44 may be conventional, as disclosed in U.S. Pat. No. 5,193,110.

As described above, it is well known that any telephone user, including subscriber 10 may call any automated telephonic information service (ATIS) 80. If the phone number of the ATIS 80 is dialed directly by the subscriber 10, the central office 20 will connect the subscriber 10 to the ATIS 80. According to the present invention, an alternative route to reaching the ATIS 80 is for the subscriber 10 to access, via the central office 20, an information services system 12 which can act as a gateway system. The active MCU which is illustrated to be $MCU_1$ 38 controls the DSS 22 to connect the subscriber 10 to one of the APUs, such as $APU_1$ $44_1$. The $APU_1$ $44_1$ executes the processing illustrated in FIG. 3. The entire processing may be executed by a single APU 44, or the subscriber 10 may be passed off to one or more other APUs 44 as the specific type of processing required by the subscriber 10 is determined. For example, one or more audio menus 82 may be generated by $APU_1$ $44_1$. If the subscriber 10 wishes to use the information services system 12 in accordance with the present invention, the subscriber 10 will eventually respond to a menu prompt to request either use of the learn mode, identified in step 84, or the assisted execution mode, identified in step 85. A different APU 44 could be used for the learn mode steps than is used for the execution mode steps. For simplicity of description, it will be assumed that the same APU 44 performs all of the steps illustrated in FIG. 3.

When the APU 44 receives an indication to enter the gateway learn mode, it will be determined 84 that call progress tones should be monitored. In the learn mode, the active MCU 38 controls the DSS 22 to provide a connection to the central office 20. Preferably, this connection is provided via a separate port to the APU 44 performing the steps illustrated in FIG. 3. This permits the APU 44 to distinguish between signals on the line connected to the subscriber 10 and signals on the line connected to the ATIS 80. As a result, the APU 44 is able to separately identify 86 the presence of DTMF and voice signals from the subscriber 10 and call progress signals and information from the ATIS 80. In the learn mode, all DTMF signals are generated by the subscriber 10 using a conventional 12- or 16-key keypad. Thus, these DTMF signals will be referred to as original DTMF signals.

When a key is pressed by the subscriber, sending a DTMF signal to a first APU port (port 1) in response to accessing or controlling the ATIS 80, the DTMF signal is stored as a code and is regenerated by a second APU port (port 2) to send to the ATIS 80. Both ports may be controlled by a single process or interprocess communication (IPC) may be used to control the ports. The APU 44 stores 88 response codes representing the original DTMF signals and associated timing data in, e.g., one of the hard drives 64, 66 (FIG. 2) and informs the MCU what is stored and how it can be accessed, in a manner similar to that used for voice mail messages.

The MCU will command the DSS 22 to send all audio signals from the ATIS 80 to both the subscriber 10 and the second APU port. This allows the subscriber to hear what should be responded to and allows the second APU port to hear important audio reference information which will be stored in the response code list. The DSS 22 may be used to perform this function. The same mechanism (hardware and software) used to determine responses to the audio menu 82 can be used to identify the original DTMF signals, so that a digital representation of the digit or character indicated by the DTMF signal can be stored. The response codes may be conventional codes, such as the American Standard Code for Information Interchange (ASCII) or, since there are at the most 16 possible DTMF codes, as few as four bits could be used for the response code.

In addition to storing 88 the response code, the timing with which the original DTMF signals are generated is also stored. Preferably, the call progress tones from the line connected to the ATIS 80 and other signals received from both the subscriber 10 and the ATIS 80 are used to provide timing information. For example, the DTMF signals generated between the dial tone and a ring signal or other call progress tone are stored 88 as the telephone number of the ATIS 80. Assuming that a ring signal is received, the approximate amount of time from when the ring signal stops and another DTMF signal is generated by the subscriber 10 may be stored as an amount of time for response to the first menu from the ATIS 80. In addition, a representation of the energy signals received from the ATIS 80 in the learn mode could be stored for matching with signals received from the ATIS 80 during subsequent calls in the execution mode as a form of voice recognition. Alternatively, voice recognition techniques may be used to identify key events in the call flow. Due to the changes in the information and menus produced by some automated telephonic information services, typically the energy signals may not be very helpful in identifying the menu being generated. In an alternative embodiment of the present invention, the menus generated 82 by the gateway system 12 include an option in the learn mode which permits the subscriber 10 to request or suppress storage of the energy signals received from the ATIS 80 for the purpose of identifying the proper response to be generated during the execution mode.

The storing in step 88 results in a list of codes associated with the ATIS 80. This enables the subscriber 10 to access the gateway system 12 and request execution of a previously stored list of codes in an assisted execution mode. The subscriber 10 can listen to the responses obtained from the ATIS 80 without having to enter responses to all of the prompts generated by the ATIS 80. However, this is only a small portion of the capability of the present invention. In addition to identifying 86 DTMF signals and incoming signals, such as call progress signals, from the line connected to the ATIS 80, the APU 44 is preferably programmed to identify 90 subscriber commands.

There are two ways of identifying 90 subscriber commands. The first requires the least sophisticated equipment in the gateway system 12, while the second is easiest for a user. The former method uses entries on the keypad of the subscriber's telephone. For example, the "*" key may be used to signify that a command to the gateway system will follow. In this case, the gateway system would respond to "**" by passing a single asterisk to the automated telephonic information service presently connected. Anything else would be evaluated as one of the commands described in more detail below. The keypad entered commands could include "*1" indicating that the following codes should not be recorded, "*2" could indicate that the following codes should be recorded, "*3" could indicate that automatically generated codes during execution should stop (pause), to permit manually entered responses and "*4" could indicate that automatically generated codes should resume, during both learning and assisted execution modes.

In the preferred embodiment the subscriber commands are spoken and voice recognition is used to identify the command. Limited voice recognition systems satisfactory for this purpose are available from Voice Control Systems of Dallas, Tex.; Voice Processing Corporation of Cambridge, Mass. and Scott Instruments of Denton, Tex. With these systems, when a subscriber initially enters the learn mode, or as part of the process of initializing a new subscriber, the APU 44 requests the subscriber to repeat a list of commands, one at a time, so that sampled voice signals corresponding to specific control codes can be stored on one of the hard drives 64, 66 or in a memory provided by the voice processing system. When a signal received from the subscriber 10 is determined 90 by the voice recognition system to match one of the previously stored sample voice signals, the APU determines which command signal was generated by the subscriber. If voice recognition is not used, the APU 44 may prompt the subscriber 10 for commands by providing a menu of options in a manner similar to conventional voice mail. If voice recognition is available, then processing continues depending upon the particular command which was spoken.

As an example, a small set of commands will be described. The present invention is not limited to using only these commands, nor must all of these commands be provided. However, given the current limited capabilities of voice recognition systems and relatively high costs of such systems, the command set is kept small, so that a single voice recognition system can be used for many subscribers. The names of the commands used below may be the words which are spoken, or other words which are more easily distinguished by a particular voice recognition system may be spoken to cause the APU 44 to perform the functions described, or the commands may be entered using the keypad as described above.

Figure 3:
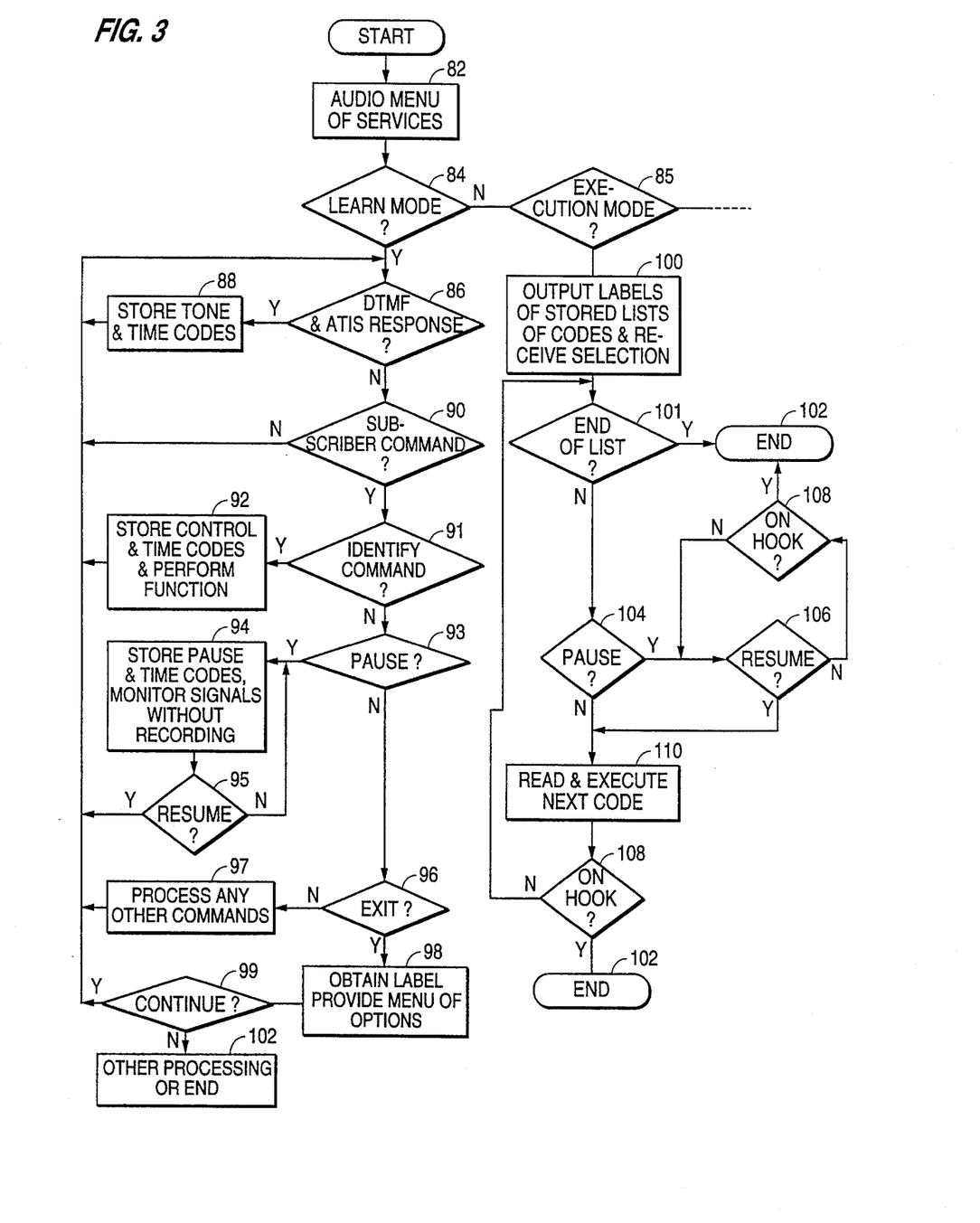
FIG. 3 is a flowchart of a method according to the present invention.

The commands used, by way of example, in FIG. 3 include pick-up (to go off-hook), hang-up, record start, various stop commands including paused stop, event stop, timed stop, pause, resume and exit. The pick-up and hang-up commands are included to enable the subscriber to access more than one ATIS 80 by a single list of codes. This enables a single list of codes to obtain, for example, a bank balance, a weather report and a stock quote. The record start and the various stop commands enable selected portions of the information obtained from one or more ATIS 80 to be recorded into a single voice mail message during unassisted execution mode. The paused stop function enables information to be recorded until a pause is detected (silence from the ATIS 80) for, e.g., 2–4 seconds; the timed stop function enables information to be recorded until a pre-defined amount of time has elapsed; and, the event stop function enables information to be recorded until a pre-recorded or a pre-arranged signal is matched (e.g., tone or voice pattern). Many of these commands may be used during assisted execution mode, as well as during the learn mode. If the APU 44 identifies 91 any of these commands, the instructed function is performed and a control code is stored 92, together with a time code or other indication of the time or event corresponding to receipt of the command signal from the subscriber 10.

Preferably, port 2 of the APU 44 monitors the voice band signals received from the ATIS 80 while port 1 of the APU 44 monitors the voice signals received from the subscriber 10. Thus, the time code stored 92 with the control code may include an indication not only of the length of time since the last DTMF signal was generated by the user, but also how much time has elapsed since signals received from the ATIS 80 had one or more predetermined energy levels, frequency signatures, or both. For example, the time code may include a length of time since there was no significant voice band energy received from the ATIS 80 and the length of time that a voice band signal of some higher level was received. Additional information, including a sampled signal of the last, e.g., three to five seconds of the information received from the ATIS 80, could be stored with the control code and time code to aid in determining when the command indicated by the control code should be performed during the execution mode, as described below.

If the command signal generated by the subscriber 10 does not control recording nor requests a hang-up or pick-up signal to be generated by the APU 44 to the ATIS 80, the APU 44 tests 93 for a pause command. The pause and resume commands are used during assisted execution mode to permit variable DTMF signals to be generated by the subscriber 10 during the execution of a list of codes. During learn mode, upon detecting 93 a pause command, the APU 44 records 94 the control and time codes and continues to monitor and pass through to the ATIS signals received from the subscriber 10 without storing response codes corresponding to the DTMF signals generated by the subscriber 10. When a resume command from the subscriber 10 (prefaced by, e.g., "*4", if voice recognition is unavailable) is detected 95 by the APU 44, conventional monitoring 86 and storing 88 of the DTMF signals and testing 94 subscriber commands continues. During assisted execution mode, it is also necessary to resume "the assistant" by having the subscriber give a resume command.

In the sample set of commands, the only remaining command is exit. Therefore, a test 96 for exit is not strictly necessary. However, if there are other commands, or error processing is desired, appropriate steps can be performed 97. When it has been determined 96 that an exit command is issued, the subscriber 10 is prompted 98 for an audio label for the list of codes previously stored. The voice signals received in response to the prompt are stored as an audio label, so that the subscriber can select the appropriate list of codes for execution or subsequent editing, as described below.

In addition to prompting for an audio label, a menu of options may be generated 98 upon exit from the learn mode so that the subscriber can specify how the list of codes is to be used. One option may be to indicate whether an on-hook signal is to be generated at the end of the list of codes. One use for the inclusion of such a hang-up option after the exit command is in an embodiment of the present invention which does not include voice command capability. Several lists of codes could be concatenated to perform different operations on a single ATIS 80.

Other options in the audio menu generated in step 98 could include indicating whether the list of codes should be initiated automatically with a certain frequency, at a certain future time or times, only upon request by the subscriber 10, or upon the occurrence of an event, such as login to a voice mail box by the subscriber 10. The frequency of use could be daily, hourly, weekly, etc., depending upon the service provided by the ATIS 80. On the other hand, other lists of codes, such as one associated with an airline reservation phone number or direct marketing order phone number might only be executed upon request by the subscriber 10, since variable information, identifying a flight or product, would always be entered by the subscriber 10. These lists and/or gateway capabilities could be provided to the subscriber 10 by the service provider or manufacturer, thus making it possible to offer a voice mail system which utilizes other services such as weather, airline information, horoscopes, etc. without having to have the capabilities resident on the local platform.

As noted above, an embodiment of the present invention could have no voice recognition capability. In this case, the signals following a predefined attention signal, such as "*" could be interpreted as commands and if no command is received after a predetermined period of time, such as five seconds, an audio menu could be generated 98 by the APU 44. Alternatively, the menu could be generated 98 immediately upon detecting the predefined attention signal. The menu generated 98 in either embodiment may include the ability to continue in the learn mode as indicated by test 99 in FIG. 3. This option is particularly important in an embodiment without voice recognition capability, to simulate the pause and resume commands available in a voice recognition system.

As indicated in FIG. 3, one of the options in the initial audio menu(s) 82 is to execute a previously stored list of codes. When the APU 44 determines 85 that the subscriber requested the assisted execution mode, the previously stored audio labels are used to describe the lists of codes and the list identified by the subscriber 10 is selected in response to output of the labels. During execution of a list of codes, the APU 44 will test 101 for the end of the list of codes. Execution will end 102 with appropriate processing, depending upon whether the list of codes is being automatically executed or executed upon request by the subscriber 10. During automatic execution, the APU 44 may perform the usual steps for storing a voice mail message and use a label previously stored by the subscriber to identify the voice mail message. In the case of a list of codes executed upon request by the subscriber 10, control may be returned to the subscriber 10 for conventional handling of any messages recorded during execution of the list of codes and for continued interaction with the ATIS 80 if no on-hook signal was sent. Additionally, the execution mode might be triggered by an event such as the login of the subscriber to a VM box (e.g., to get weather or a stock quote.)

As described above, when the APU 44 detects 104 a control code or command signal received 104 from the subscriber 10 corresponding to the pause command, execution of the list of codes is interrupted until a resume command is received 106 from the subscriber. Since pause and resume commands are used to permit the subscriber to enter variable DTMF signals, a pause command would only be present in a subscriber initiated type of code list. In the event of an on-hook signal being detected 108 on the line connected to the subscriber 10, execution of the list of codes will be terminated 102 in the manner described above. When the resume command is detected 106 during assisted execution mode, the next code in the list of codes is read 110 and a DTMF signal is generated or appropriate processing is performed based on a control code. The functions performed in step 110 include storing representations of the audio signals received from the ATIS 80 if the control code for the record start command was previously read and the recording has not yet been stopped. In the preferred embodiment, long pauses are not recorded. The test 108 for an on-hook signal from the subscriber 10 is preferably made once every, e.g., second, and is thus illustrated in the code execution loop as well as the loop waiting for a resume command.

As noted above during description of the learn mode, the timing information stored as time codes with the response codes can include timing relative to voice band signals received on the line connected to the ATIS 80. However, if there is a significant increase in the energy level on the line connected to the ATIS 80 prior to generation of one of the original DTMF signals during learn mode, the DTMF signal corresponding to the response code representing the original DTMF signal is not generated 110 in the execution mode, until the energy level on the line connected to the ATIS 80 increases. If there is a significant delay between the increase in voiceband energy on the line connected to the ATIS 80 and the generation of the original DTMF signals during the learn mode, the DTMF signal generated in the execution mode may be delayed by a similar amount. Furthermore, if the original DTMF signal was not generated until after the voiceband energy level decreased, i.e., the prompt from the ATIS 80 was completed, during execution mode the APU 44 may wait for the end of the prompt also. This enables the present invention to work with ATIS systems of three types: (1) systems which will store DTMF codes received prior to generation of a prompt to which they are responding, (2) systems which permit prompts to be interrupted by the generation of a response and (3) systems which only respond to DTMF signals received after a prompt is completed.

The many features and advantages of the present invention are apparent from the detailed specification, and thus it is intended by the appended claims to cover all such features and advantages of the system which fall within the true spirit and scope of the invention. Further, since numerous modifications and changes will readily occur to those skilled in the art from the disclosure of this invention, it is not desired to limit the invention to the exact construction and operation illustrated and described. For example, the present invention could be used to obtain messages from a number of voice mailboxes and store the messages in a single voice mailbox so that the user would only need to login to a single mailbox in order to hear messages from multiple mailboxes. Accordingly, suitable modifications and equivalents may be resorted to, as falling within the scope and spirit of the invention.

What is claimed is:

1. A method of automatically interacting with automated telephonic information services, comprising the steps of:

(a) detecting original response signals corresponding to response codes as the original response signals are supplied to at least one automated telephonic information service;

(b) storing a list of response codes and control codes in sequence, associated with control of the at least one automated telephonic information service, the response codes representing response signals and the control codes controlling timing of generation of the response signals; and (c) automatically generating the response signals with timing thereof controlled by the control codes stored in step (b).

2. A method as recited in claim 1, further comprising the following steps performed before steps (a), (b) and (c):

(d) generating a first audio menu including access to a gateway learn mode; and (e) receiving an indication to enter the gateway learn mode.

3. A method as recited in claim 2, further comprising the following steps performed after steps (d) and (e) and before steps (a), (b) and (c):

(f) receiving command signals to control said automatically generating in step (c); and (g) producing the control codes for said storing in step (b) in dependence upon the command signals received in step (f).

4. A method as recited in claim 3, wherein the command signals received in step (f) are DTMF signals generated by a telephone keypad.

5. A method as recited in claim 3, wherein the command signals received in step (f) are voice signals received from a telephone mouthpiece, and wherein said producing in step (g) uses voice recognition of predefined command terms.

6. A method as recited in claim 5, further comprising the step of (h) storing, prior to said receiving in step (f), sampled voice signals and control codes, including first and second sampled voice signals and a first control code, corresponding to the first sampled voice signal, wherein said storing in step (b) includes storing the first control code in the list of codes in response to detection of a first command signal matching the first sampled voice signal, and wherein said generating of the response signals in step (c) is performed sequentially upon reading the response codes in the list of codes stored in step (b) with interruption of said generating in response to reading the first control code in the list of codes stored in step (b) and with resumption of said generating in response to detection of a second command signal matching the second sampled voice signal, after the interruption of said generating in step (c).

7. A method as recited in claim 5, further comprising the steps of:

(h) storing, prior to said receiving in step (f), sampled voice signals corresponding to specific control codes, including first and second sampled voice signals and a first control code, corresponding to the first sampled voice signal; and (i) recording audio signals received from the at least one automated telephonic information service in response to reading the first control code in the list of codes, for a period of time determined in dependence upon a second control code, and wherein said storing said control codes in step (b) includes storing the first control code in the list of codes in response to detection of a first command signal matching the first sampled voice signal and storing the second control code in the list of codes in dependence upon detection of a second command signal matching the second sampled voice signal.

8. A method as recited in claim 3, wherein a subscriber produces the original response signals detected in step (a), wherein said receiving in step (f) comprises receiving an exit command signal matching a predefined exit signal, and wherein said method further comprises the steps of:

(h) interrupting the gateway learn mode to generate an audio message to and receive a response from the subscriber; and (i) preventing transmission to the at least one automated telephonic information service of the original response signals detected in step a while the gateway learn mode is interrupted by step (h).

9. A method as recited in claim 8, wherein the audio message generated upon said interrupting in step (h)

includes a second audio menu prompting the subscriber for an indication of a code list type including an automatically initiated type and a subscriber initiated type.

10. A method as recited in claim 9, further comprising the steps of:
(j) prompting the subscriber for an audio label for the list of codes stored in step (b) after said interrupting in step (h);
(k) receiving labeling voice signals in response to said prompting in step (j);
(l) storing the audio label in dependence upon the labeling voice signals received in step (k);
(m) prompting the subscriber for a timing indication in response to receiving an indication of an automatically initiated type of code list; and
(n) storing an initiation timing code upon receipt of the timing indication prompted in step (m).

11. A method as recited in claim 8,
wherein the audio message generated upon said interrupting in step (h) includes a second audio menu requesting the subscriber to produce at least one of the command signals, and
wherein said method further comprises the step of (j) returning to the gateway learn mode upon receiving a return command signal.

12. A method as recited in claim 2,
further comprising the step of (f) detecting timing of the original response signals received in step (a),
wherein said storing in step (b) further comprises the step of (b1) storing time codes, corresponding to the stored response codes, in dependence upon the timing detected in step (f), and
wherein said automatically generating in step (c) generates the response signals in dependence upon the response, control and time codes stored in steps (b) and (b1).

13. A method as recited in claim 2,
wherein a subscriber produces the original response signals detected in step (a),
wherein said method further comprises the step of (f) detecting incoming signals, including call progress signals, received by the subscriber in response to the original response signals produced by the subscriber and in response to the response signals generated in step (c), and
wherein said generating in step (c) generates the response signals in dependence upon the incoming signals detected in step (f).

14. A method of automatically interacting with automated telephonic information services, comprising the steps of:
(a) detecting original response signals, produced by a subscriber, as the original response signals are supplied to an automated telephonic information service;
(b) storing tone codes representing the original response signals, as part of a list of codes;
(c) receiving command signals from the subscriber to control use of the response codes in the list of codes stored in step (b);
(d) storing control codes in the list of codes in dependence upon the command signals received in step (c), including first, second and third control codes;
(e) receiving an exit command signal matching a predefined exit signal;
(f) interrupting said storing of the tone codes in step (b) in response to receipt of the exit command signal;

(g) preventing transmission to the automated telephonic information service of the original response signals detected in step (a) during said interrupting in step (f);
(h) receiving an initiation request for production of reproduced response signals based on the list of codes stored in step (b) and (d);
(i) automatically generating the reproduced response signals by sequentially reading the response codes in the list of codes requested in step (h) with timing dependent upon the control codes stored in step (d) including interruption of said generating in response to reading the first control code and resumption of said generating in response to detection of a resumption command signal from the subscriber after the interruption of said generating; and
(j) recording audio signals received from the automated telephonic information service in response to reading the second control code in the list of codes, for a period of time determined by the third control code.

15. A method as recited in claim 14, further comprising the step of (k) storing, prior to said receiving in step (c), sampled voice signals, including the predefined exit signal, a resume command signal and first, second and third sampled voice signals corresponding to the first, second and third control codes,
wherein said producing of the control codes in step (d) is performed by comparing the command signals received in step (c) with the sampled voice signals stored in step (k), and
wherein resumption of said generating in step (i) is performed in response to receipt of a voice signal matching the resume command signal.

16. A method as recited in claim 14, further comprising the steps of:
(k) storing a frequency of generation for the list of codes stored in steps (b) and (d); and
(l) automatically generating the initiation request received in step (h) in dependence upon the frequency of generation stored in step (k).

17. An apparatus operatively connected to a public switched telephone network for automatically interacting with automated telephonic information services, comprising:
a memory for storing a list of codes associated with controlling at least one automated telephonic information service;
response generation means for automatically generating response signals;
a processor for reading the list of codes stored in said memory and for controlling said response generation means to produce the response signals in dependence upon the list of codes stored in said memory;
a first channel, operatively connected to said memory and said processor, for receiving original response signals and voice signals from a subscriber; and
a second channel, operatively connected to said response generation means, said processor and the public switched telephone network, for transmitting the response signals generated by said response generation means to the at least one automated telephonic information service and for supplying to said processor call progress signals and information signals received from the at least one automated telephonic information service.

18. An apparatus as recited in claim 17, further comprising switch means for switchably connecting the subscriber to the at least one automated telephonic information service, and wherein said processor controls said switch means in dependence upon control codes included in the list of codes stored in said memory and command signals received from the subscriber.

19. An apparatus as recited in claim 17, further comprising voice recognition means for generating voice pattern signals from the voice signals received via said first channel from the subscriber, wherein said memory further stores previously received voice pattern signals obtained from the subscriber in response to requests for repetition of predefined command terms, and wherein said processor controls transmission of the requests for the predefined command terms to the subscriber prior to controlling said response generation means to call the at least one automated telephonic information service and compares the voice pattern signals received from said voice recognition means during generation of the response signals by said response generation means, for comparison with the previously received voice pattern signals stored in said memory.

* * * * *